(12) United States Patent
Tanaka et al.

(10) Patent No.: US 9,878,585 B2
(45) Date of Patent: Jan. 30, 2018

(54) PNEUMATIC TIRE

(71) Applicant: Sumitomo Rubber Industries, Ltd., Kobe-shi, Hyogo (JP)

(72) Inventors: Kaori Tanaka, Kobe (JP); Atsushi Hibino, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 273 days.

(21) Appl. No.: 14/706,745

(22) Filed: May 7, 2015

(65) Prior Publication Data
US 2015/0343849 A1 Dec. 3, 2015

(30) Foreign Application Priority Data

May 29, 2014 (JP) .................... 2014-111630
Sep. 26, 2014 (JP) .................... 2014-197356

(51) Int. Cl.
*B60C 11/13* (2006.01)
*B60C 11/11* (2006.01)
*B60C 11/03* (2006.01)

(52) U.S. Cl.
CPC ........... *B60C 11/1384* (2013.01); *B60C 11/11* (2013.01); *B60C 11/1315* (2013.01);
(Continued)

(58) Field of Classification Search
CPC ............. B60C 11/1323; B60C 11/1384; B60C 11/1353; B60C 11/1315; B60C 2011/0346; B60C 2011/1361
See application file for complete search history.

(56) References Cited

U.S. PATENT DOCUMENTS 4,114,671 A 9/1978 Maiocchi et al.
5,795,415 A * 8/1998 Campana ............ B60C 11/0309
152/209.18
(Continued)

FOREIGN PATENT DOCUMENTS

CN 101618664 A * 1/2010
CN 203228598 U * 10/2013
(Continued)

OTHER PUBLICATIONS

Machine translation for Japan 2006-051836 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire includes a tread portion provided with at least one zigzag main groove extending continuously in a circumferential direction of the tire with a plurality of zigzag corners. The main groove includes a groove bottom and a pair of groove edges. The groove bottom extends in a zigzag manner in the circumferential direction of the tire with a first amplitude. The groove bottom has a width varying periodically so that a maximum width portion and a minimum width portion appear in turn at the zigzag corners. Each of the groove edges extends in a zigzag manner in the circumferential direction of the tire with a second amplitude, wherein the first amplitude is greater than the second amplitude.

13 Claims, 12 Drawing Sheets

(52) U.S. Cl.
CPC ...... *B60C 11/1323* (2013.01); *B60C 11/1353* (2013.01); *B60C 2011/0346* (2013.01); *B60C 2011/1361* (2013.01)

(56) References Cited

U.S. PATENT DOCUMENTS

2007/0012389 A1 1/2007 Ito
2013/0263988 A1* 10/2013 Minoli ............... B60C 11/0316
152/209.19

FOREIGN PATENT DOCUMENTS

| DE | 102009044886 A1 | * | 6/2011 |
|---|---|---|---|
| EP | 2340949 A1 | | 7/2011 |
| EP | 2614966 A1 | | 7/2013 |
| JP | 56-079007 A | * | 6/1981 |
| JP | 60-197409 A | * | 10/1985 |
| JP | 2006-051836 A | * | 2/2006 |
| JP | 2010-18125 A | | 1/2010 |
| NL | 7614442 A | | 7/1977 |
| WO | WO 2012/073420 A1 | | 6/2012 |

OTHER PUBLICATIONS

Machine translation for Japan 60-197409 (no date).*
Machine translation for Japan 56-079007 (no date).*
Machine translation for Germany 102009044886 (no date).*
Machine translation for China 203228598 (no date).*
Machine translation for China 101618664 (no date).*

* cited by examiner

PNEUMATIC TIRE

BACKGROUND OF THE INVENTION

Field of the Invention

The present invention relates to pneumatic tires, and in particular, relates to a pneumatic tire having a tread main groove that may prevent stone-biting.

Description of the Related Art

Japanese Unexamined Patent Application Publication No. 2010-18125 discloses a pneumatic tire which includes a tread portion provided with a circumferentially and continuously extending main groove. In order to avoid stone-biting into the main groove, the main groove includes a pair of groove walls each of which includes a radially inner steep sloped wall and a radially outer gentle sloped wall, wherein the radial height of the gentle sloped wall is periodically varying in a longitudinal direction of the main groove.

Unfortunately, the groove wall configuration described above is not sufficient to prevent the stone-biting for pneumatic tires for use on gravel and the like.

SUMMARY OF THE INVENTION

In view of the above problems in the conventional art, the present invention has an object to provide a pneumatic tire having a tread main groove that may prevent stone-biting.

According to one aspect of the invention, a pneumatic tire includes a tread portion provided with at least one zigzag main groove extending continuously in a circumferential direction of the tire with a plurality of zigzag corners. The main groove includes a groove bottom and a pair of groove edges. The groove bottom extends in a zigzag manner in the circumferential direction of the tire with a first amplitude. The groove bottom has a width varying periodically so that a maximum width portion and a minimum width portion appear in turn at the zigzag corners. Each of the groove edges extends in a zigzag manner in the circumferential direction of the tire with a second amplitude, wherein the first amplitude is greater than the second amplitude.

In another aspect of the present invention, the main groove may include a pair of groove walls each of which extends from the groove bottom to one of the groove edges. Each of the groove walls may include an external corner and an internal corner. An inclination angle $\alpha 2$ of the external corner with respect to a tread normal line at the minimum width portion of the groove bottom may be greater than an inclination angle $\alpha 1$ of the external corner with respect to the tread normal line at the maximum width portion of the groove bottom.

In another aspect of the present invention, the main groove comprises a pair of groove walls each of which extends from the groove bottom to one of the groove edges. Each of the groove walls includes an external corner and an internal corner. An inclination angle $\alpha 3$ of the internal corner with respect to a tread normal line at the maximum width portion of the groove bottom may be equal to or less than an inclination angle $\alpha 4$ of the internal corner with respect to the tread normal line at the minimum width portion of the groove bottom.

In another aspect of the present invention, the main groove may extend proximate to a tread edge. The zigzag corners comprise an axially inner protruding corner and an axially outer protruding corner, and the maximum width portion of the groove bottom may appear at the axially inner protruding corner.

In another aspect of the present invention, the main groove may be provided with a protrusion on the groove bottom. The protrusion may be formed at the maximum width portion of the groove bottom, and the protrusion may not be formed at the minimum width portion of the groove bottom.

In another aspect of the present invention, the protrusion may have a width smaller than that of the maximum width portion of the groove bottom.

In another aspect of the present invention, the protrusion may have a width in a range of from 20% to 40% of a width of the maximum width portion of the groove bottom.

In another aspect of the present invention, the protrusion may have a radial height in a range of from 5% to 25% of a maximum depth of the main groove.

In another aspect of the present invention, the main groove may include a pair of groove walls each of which extends from the groove bottom to one of the groove edges. Each of the groove walls comprises an external corner. A radially outward portion of the external corner may be provided with a chamfered portion.

In another aspect of the present invention, the chamfered portion may have a slanted surface that spreads among a ground contacting surface of the tread portion and a pair of two wall planes forming the external corner.

In another aspect of the present invention, the chamfered portion is located in an axial distance of from 0.5 to 3.0 mm from an imaginary point where a ground contacting surface of the tread portion and a pair of two wall planes forming the external corner intersect imaginarily.

In another aspect of the present invention, the chamfered portion may have a radial length in a range of from 25% to 60% of a maximum depth of the main groove.

In another aspect of the present invention, each of the groove walls may include an internal corner, and an inclination angle of the external corner with respect to a tread normal line is greater than an inclination angle of the internal corner with respect to the tread normal line in the respective zigzag corners.

DESCRIPTION OF THE EMBODIMENTS

Figure 1:
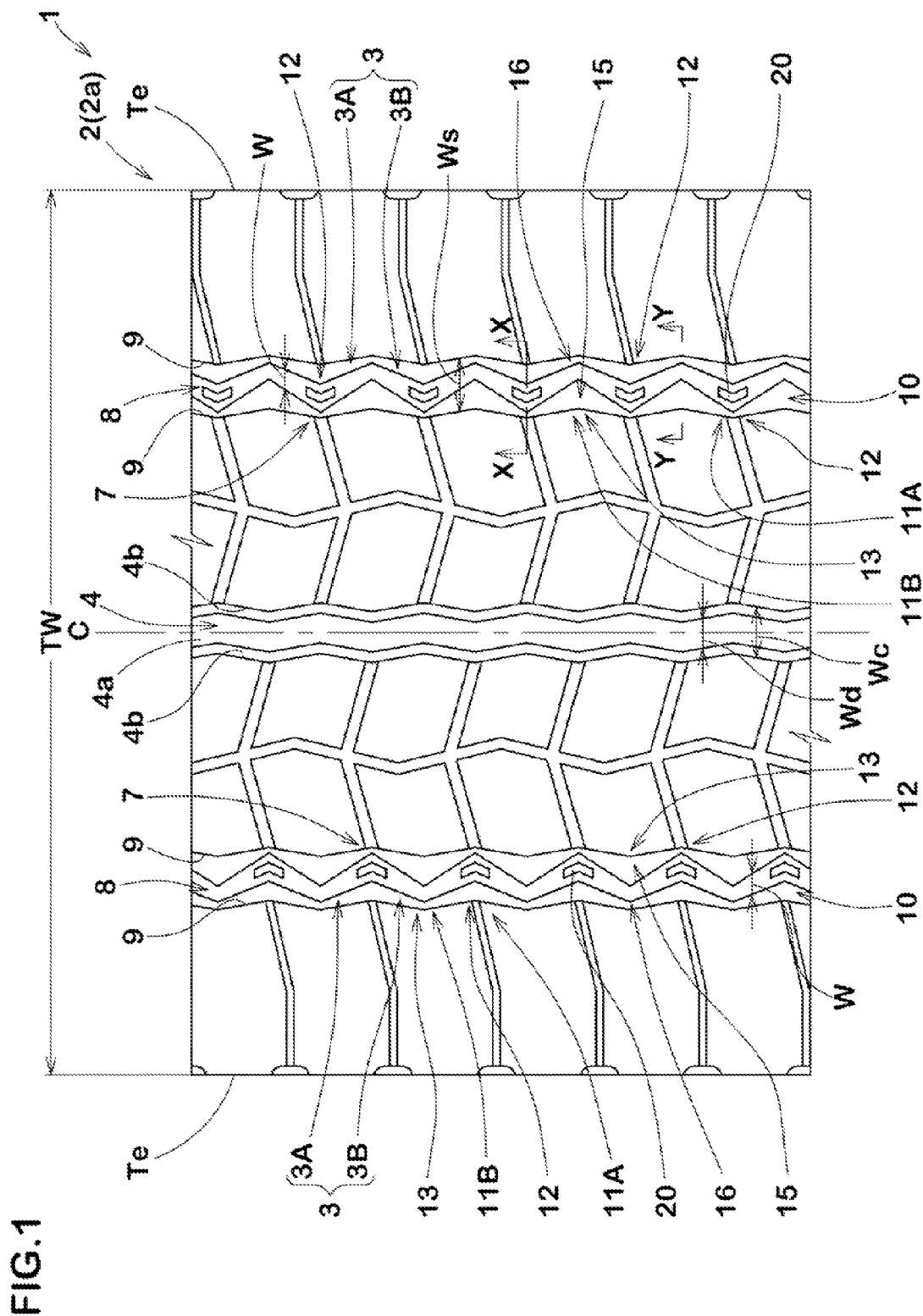
FIG. 1 is a development view of a tread portion of a pneumatic tire according to a first embodiment of the present invention.

An embodiment of the present invention will be explained below with reference to the accompanying drawings. It should be noted that like elements are denoted by the same reference numerals throughout the disclosure.

First Embodiment

FIG. 1 illustrates a tread portion 2 of a pneumatic tire 1 according to the first embodiment of the present invention. As shown in FIG. 1, the pneumatic tire 1 may be suitably embodied as a heavy duty pneumatic tire for trucks or buses.

The tread portion 2 is provided with at least one main groove extending continuously in a circumferential direction of the tire. In this embodiment, the at least one main groove includes a pair of shoulder main grooves 3 each of which is arranged proximate to a tread edge Te in each side of the tire equator C, and a central main groove 4 arranged on the tire equator C. For the at least one main groove, it should be noted that the present invention is not particularly limited to the configuration shown in FIG. 1.

In each side of the tire equator C, the tread edge Te is defined as an axially outermost edge of the tread portion 2. In the event that the axially outer most edge of the tread portion 2 is not clearly identified in appearance, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is defined as the width measured under the normally inflated unloaded condition, as the axial distance between the tread edges Te and Te.

The shoulder main groove 3 extends in a zigzag manner in the circumferential direction of the tire with a plurality of zigzag corners 7. Namely, the shoulder main groove 3 includes a first inclined element 3A and a second inclined element 3B having an opposite inclination to the first inclined element 3A which are alternately arranged in the circumferential direction of the tire to form the zigzag corner 7 therebetween. The shoulder main groove 3 includes an axial component of groove edges that may offer stable driving by generating traction on rough terrain such as unpaved path.

The shoulder main groove 3 includes a groove bottom 8, a pair of groove edges 9 on a ground contacting surface 2a of the tread portion 2, and a pair of groove walls 10 each of which extends from the groove bottom 8 to one of the groove edges 9.

Figure 4:
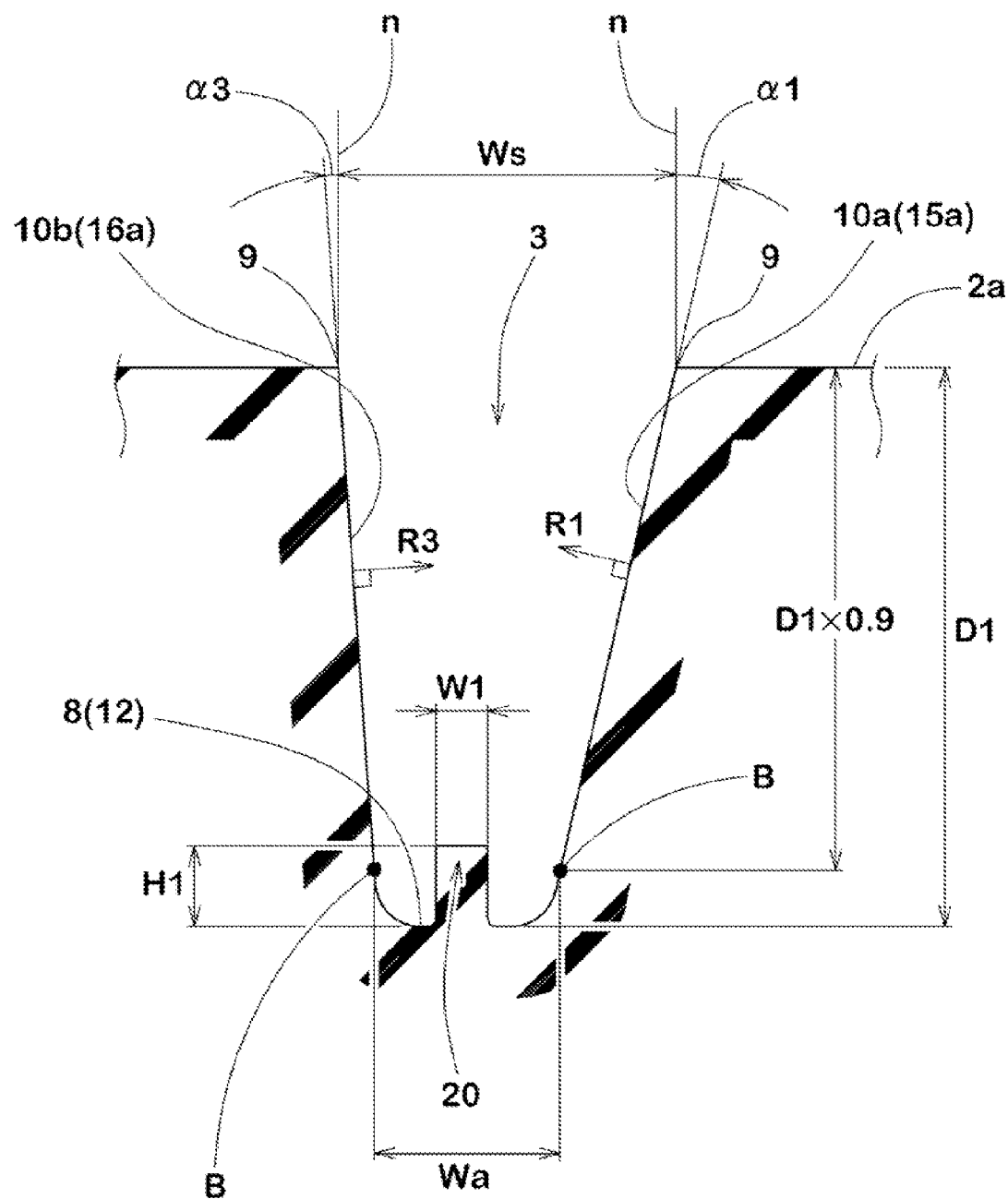
FIG. 4 is a cross-sectional view taken along the lines X-X of FIG. 1.

The groove bottom 8 is the radially innermost surface which has a maximum depth D1 shown in FIG. 4 and which extends in the axial direction of the tire parallel to the ground contacting surface 2a of the tread portion 2. When the radially innermost surface of the groove is connected to the groove wall 10 through a round chamfer, the groove bottom 8 is defined as a region between points B located on the groove surface at a 90% depth of the maximum depth D1.

Figure 2A:
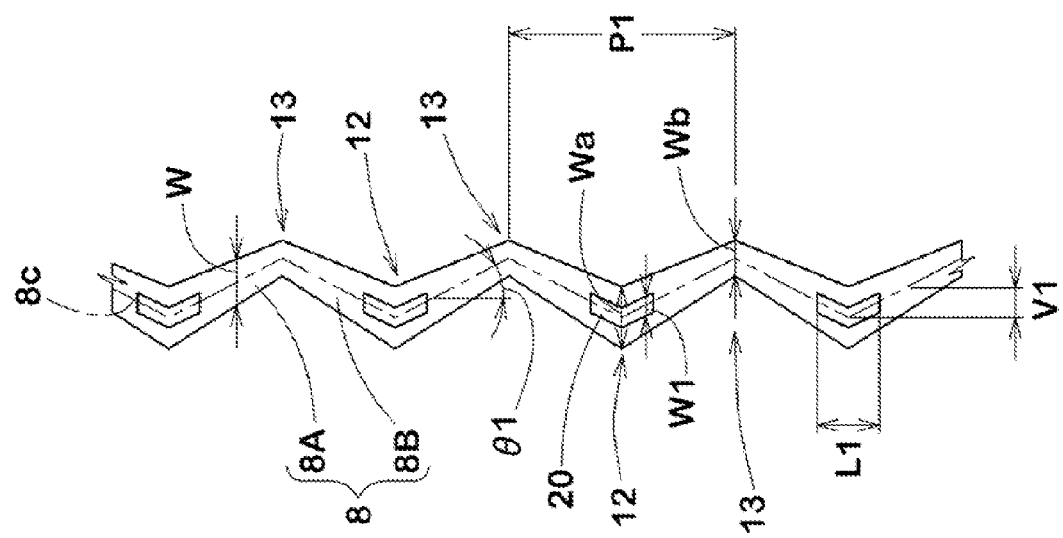
FIG. 2A is an enlarged view of a groove bottom of a shoulder main groove illustrated in FIG. 1.

FIG. 2A illustrates an enlarged view of the groove bottom 8 of the right side shoulder main groove 3 of FIG. 1. As shown in FIG. 2A, the groove bottom 8 includes a first inclined bottom portion 8A and a second inclined bottom portion 8B having an opposite inclination to the first inclined bottom portion 8A. In FIG. 2A, the first inclined bottom portion 8A has an axial width W which is gradually increasing upwardly so as to have a trapezoidal shape. In FIG. 2A, the second inclined bottom portion 8B has an axial width W which is gradually decreasing upwardly so as to have a trapezoidal shape. The first inclined bottom portion 8A and the second inclined bottom portion 8B are arranged alternately in the circumferential direction of the tire so that the groove bottom 8 extends in a zigzag manner in the circumferential direction of the tire with a first amplitude V1. Furthermore, the groove bottom 8 has the width W varying periodically so that a maximum width portion 12 and a minimum width portion 13 appear in turn at the zigzag corners. The zigzag shape of the groove bottom 8 is not particularly limited to the above structure but can be employed a wave manner (smooth zigzag).

Since the maximum width portion 12 may provide a low holding force to a stone trapped in the shoulder main groove 3, the maximum width portion 12 may release the stone easily therefrom, thereby preventing stone-biting. When a stone is trapped in the minimum width portion 13, the stone may gradually move toward the maximum width portion 12 at which less friction force will act on the stone due to opening-closing deformation of the shoulder main groove 3 during traveling, and then the stone would be released therefrom.

Figure 2B:
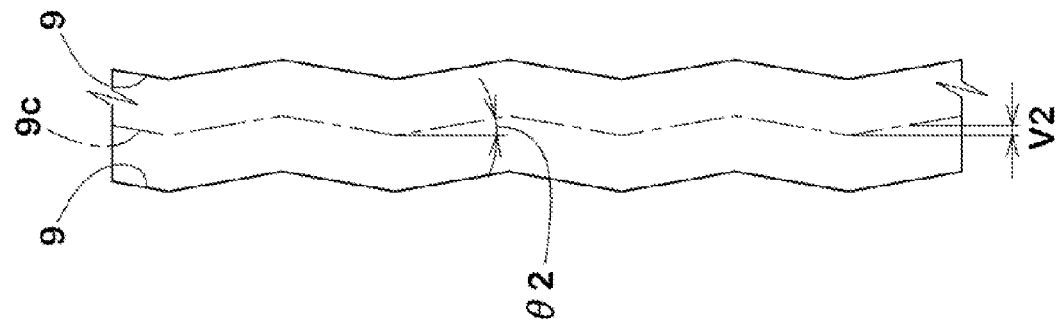
FIG. 2B is an enlarged view of groove edges of the shoulder main groove illustrated in FIG. 1.

FIG. 2B illustrates an enlarged view of the groove edges 9 of the right side shoulder main groove 3 of FIG. 1. As shown in FIG. 2B, each of the groove edges 9 extends in a zigzag manner in the circumferential direction of the tire with a second amplitude V2. The zigzag shape of the groove edges 9 is synchronized with that of the groove bottom 8. As shown in FIGS. 2A and 2B, the first amplitude V1 of the groove bottom 8 is greater than the second amplitude V2 of the respective groove edges 9. Accordingly, the shoulder main groove 3 may have the pair of groove walls 10 each having an inclination angle with respect to a tread normal line, wherein the inclination angle varies in the circumferential direction of the tire. Thus, the shoulder main groove 3 may provide elastic restoring force whose direction varies in the circumferential direction of the tire to push the stone trapped in between the groove walls 10. The stone trapped in the shoulder main groove 3 may move easily in the circumferential direction of the tire, and then it would be released from the shoulder main groove 3.

Furthermore, since the second amplitude V2 of the groove edge 9 is less than the first amplitude V1 of the groove bottom 8, the rigidity of the ground contacting surface 2a of the tread portion 2 around the shoulder main groove 3 may be enhanced, thereby improving wear resistance of the tire. Here, the first amplitude V1 of the groove bottom 8 is defined using a centerline 8c of the groove bottom 8, and the second amplitude V2 of the groove edge 9 is defined using a centerline 9c of the area between the groove edges 9 and 9.

Although the shoulder main groove 3 tends to bite a stone due to lateral force when cornering, the shoulder main groove 3 in accordance with the present embodiment may efficiently avoid stone-biting even in such a cornering situation.

In order to further improve the stone-biting resistance effect of the shoulder main groove 3, the second amplitude V2 of the groove edges 9 is preferably in a range of from 20% to 50% of the first amplitude V1 of the groove bottom 8.

In order to further improve the stone-biting effect of the shoulder main groove 3, an angle θ1 of the centerline 8c of the groove bottom 8 is preferably in a range of from 10 to 40 degrees with respect to the circumferential direction of the tire. The difference (θ1−θ2) between the angle θ1 of the centerline 8c of the groove bottom 8 and an angle 82 of the centerline 9c between the groove edges 9 with respect to the circumferential direction of the tire is preferably in a range of from 10 to 30 degrees.

As shown in FIG. 1, the zigzag corners 7 comprise an axially inner protruding corner 11A and an axially outer protruding corner 11B. The maximum width portion 12 of the groove bottom 8 appears at the axially inner protruding corner 11A. The maximum width portion 12 may provide a larger groove volume than that of the minimum width portion 13, thereby lowering tread rigidity therearound. In order to further improve wear resistance of the tire, the maximum width portion 12 may preferably appear at the axially inner protruding corner 11A at which a relatively low lateral force will be acted during cornering as compared with the axially outer protruding corner 11B.

On the other hand, the minimum width portion 13 of the groove bottom 8 appears at the axially outer protruding corner 11B. Thus, the rigidity of the tread portion 2 around the shoulder main groove 3 may be equalized in the circumferential direction of the tire, thereby improving wear resistance of the tire.

In order to further improve the above effects, the minimum width portion 13 preferably has a width Wb in a range of from 50% to 80% of a width Wa of the maximum width portion 12, as shown in FIG. 2A.

Figure 3:
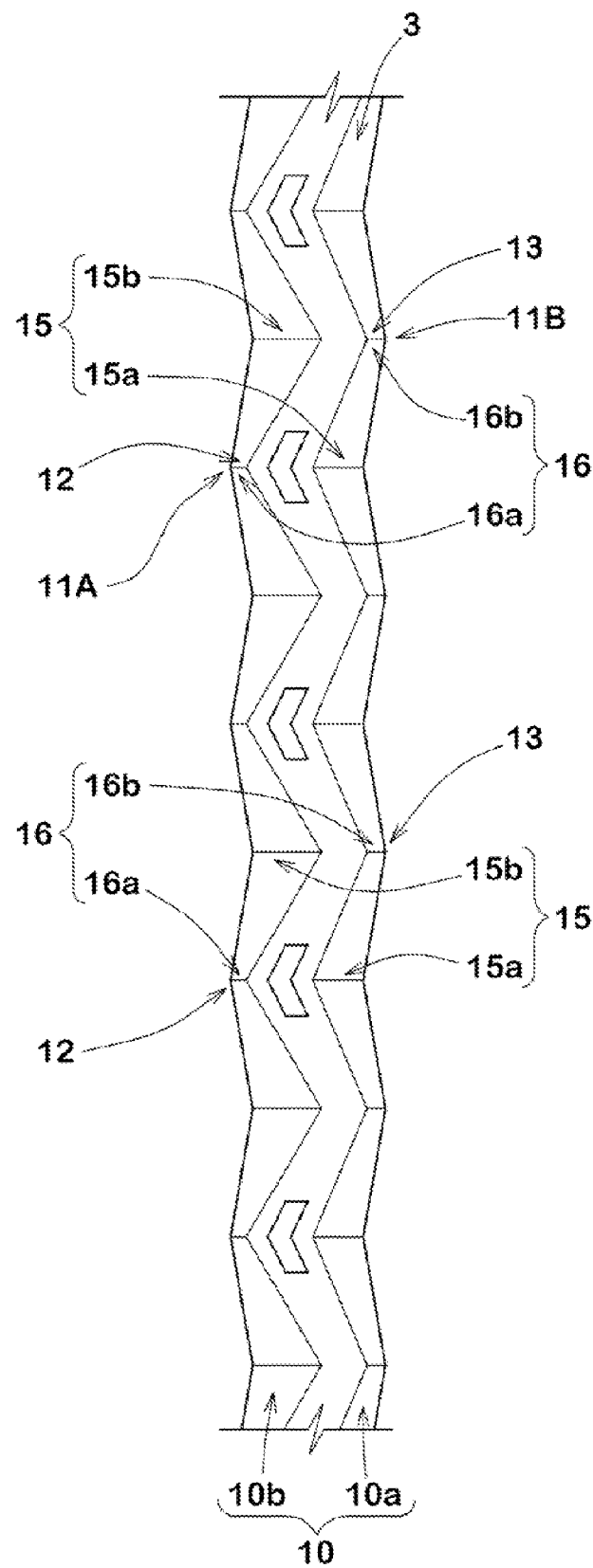
FIG. 3 is an enlarged view of the shoulder main groove illustrated in FIG. 1.

FIG. 3 illustrates an enlarged view of the right side shoulder main groove 3 of FIG. 1. As shown in FIG. 3, the groove walls 10 comprises an outer groove wall 10a arranged on the side of the tread edge Te, and an inner groove wall 10b arranged on the side of the tire equator C.

Each of the groove walls 10a and 10b includes an external corner (projected corner) 15 that protrudes outwardly and an internal corner (dented corner) 16 that is dented inwardly.

At the axially inner protruding corner 11A where the maximum width portion 12 appears, the outer groove wall 10a is formed into the external corner 15a, and the inner groove wall 10b is formed into the internal corner 16a. At the axially outer protruding corner 11B where the minimum width portion 13 appears, the inner groove wall 10b is formed into the external corner 15b, and the outer groove wall 10a is formed into the internal corner 16b.

Figure 5:
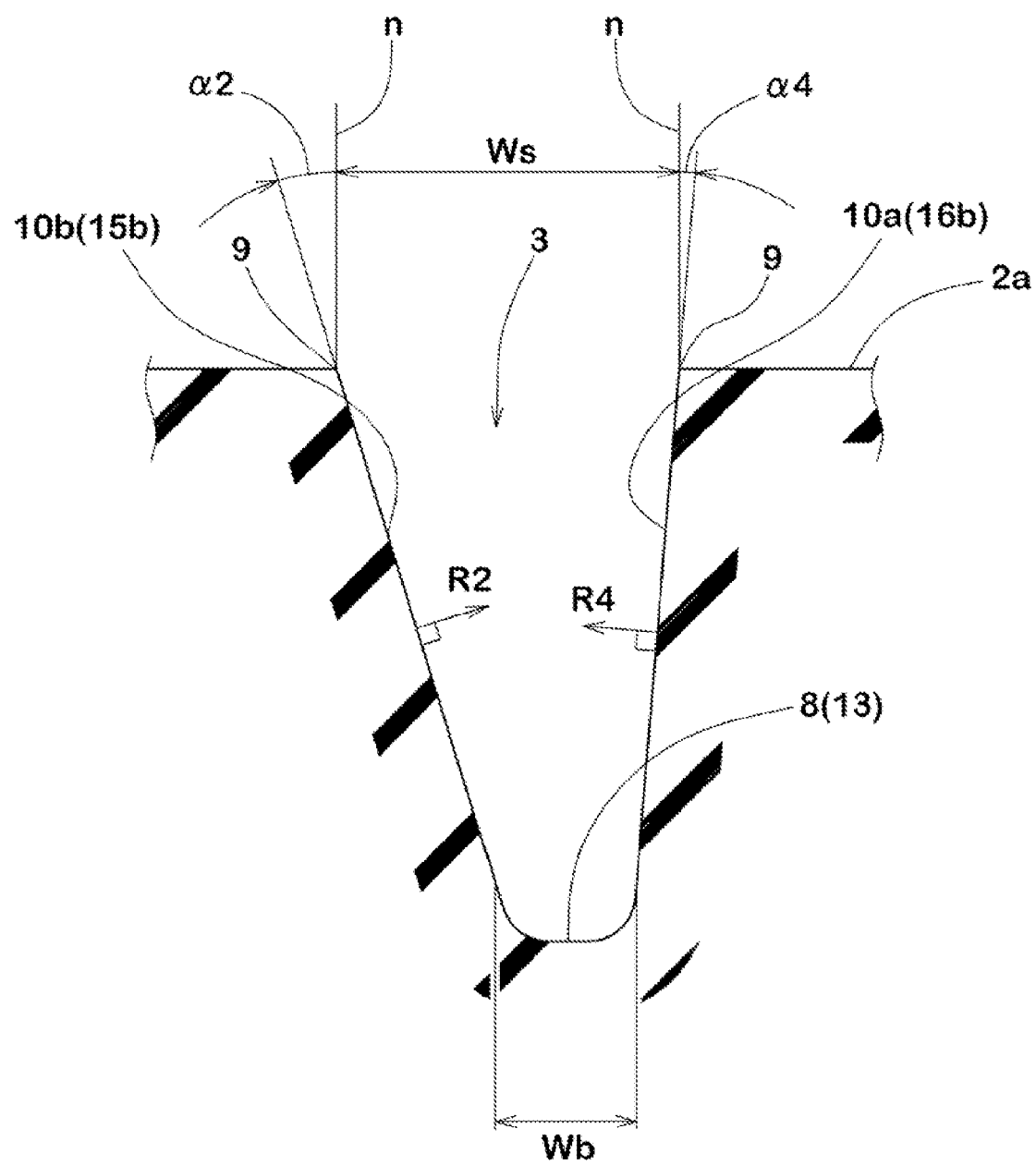
FIG. 5 is a cross-sectional view taken along the lines Y-Y of FIG. 1.

FIG. 4 illustrates a cross-sectional view of the maximum width portion 12 taken along the lines X-X of FIG. 1, and FIG. 5 illustrates a cross-sectional view of the minimum width portion 13 taken along the lines Y-Y of FIG. 1. As shown in FIGS. 4 and 5, an inclination angle α2 of the external corner 15b with respect to a tread normal line n at the minimum width portion 13 of the groove bottom 8 is greater than an inclination angle α1 of the external corner 15a with respect to the tread normal line n at the maximum width portion 12 of the groove bottom 8. The reaction force R2 from the external corner 15b against a stone trapped at the minimum width portion 13 can orient radially outward compared with the reaction force R1 from the external corner 15a against a stone trapped at the maximum width portion 12. Thus, the minimum width portion 13 may push to move the stone towards radially outwardly, thereby preventing stone-biting.

When the inclination angle α2 of the external corner 15b at the minimum width portion 13 is excessively large as compared with the inclination angle α1 of the external corner 15a at the maximum width portion 12, the tread rigidity difference between the maximum width portion 12 and the minimum width portion 13 tends to be larger, thereby lowering the wear resistance. In the view of the above, the difference (α2−α1) of inclination angles α2 and α1 is preferably in a range of from 1.5 to 6.0 degrees.

In order to further improve the above effects, the inclination angle α1 of the external corner 15a at the maximum width portion 12 is preferably in a range of not less than 8 degrees, more preferably not less than 11 degrees, but preferably not more than 20 degrees, more preferably not more than 16 degrees. Similarly, the inclination angle α2 of the external corner 15b at the minimum width portion 13 is preferably in a range of from not less than 14 degrees, more preferably not less than 15 degrees, but preferably not more than 22 degrees, more preferably not more than 19 degrees.

An inclination angle α3 of the internal corner 16a with respect to the tread normal line n at the maximum width portion 12 of the groove bottom 8 is equal to or less than an inclination angle α4 of the internal corner 16b with respect to the tread normal line n at the minimum width portion 13 of the groove bottom 8. At the minimum width portion 13 which tends to bite a stone therein due to its small width W, the reaction force R4 from the internal corner 16b against the stone can orient radially outward compared with the reaction force R3 of the internal corner 16a at the maximum width portion 12. Thus, the stone trapped at the minimum width portion 13 may be moved easily and then released.

When the inclination angle α3 of the internal corner 16a at the maximum width portion 12 is excessively small with respect to the inclination angle α4 of the internal corner 16b at the minimum width portion 13, the tread rigidity difference between the maximum width portion 12 and the minimum width portion 13 tends to be larger, thereby lowering the wear resistance. In the view of the above, the difference (α4−α3) of inclination angles α4 and α3 is preferably in a range of from 1.0 to 4.0 degrees.

In order to further improve the above effects, the inclination angle α3 of the internal corner 16a at the maximum width portion 12 is preferably in range of not less than 2.0 degrees, more preferably not less than 2.5 degrees, but preferably not more than 7.0 degrees, more preferably not more than 6.0 degrees. In the same point of view, the inclination angle α4 of the internal corner 16*b* at the minimum width portion 13 is preferably in a range of from not less than 2.5 degrees, more preferably not less than 3.0 degrees, but preferably not more than 10.0 degrees, more preferably not more than 7.0 degrees.

The shoulder main groove 3 is provided with a protrusion 20 on the groove bottom 8. When a stone is trapped above the protrusion 20 in the shoulder main groove 3, the protrusion 20 is elastically compressed by the stone. The resilience of the protrusion 20 may push the stone away from the shoulder main groove 3.

In this embodiment, the protrusion 20 is formed at the maximum width portion 12 of the groove bottom 8. The tread rigidity around the maximum width portion 12 is relatively lower than that of around the minimum width portion 13. Accordingly, the protrusion 20 may enhance a portion around the maximum width portion 12 so as to equalize the tread rigidity in the circumferential of the tire.

Referring back to FIG. 2A, the protrusion 20 extends along with the centerline 8*c* of the groove bottom 8. In this embodiment, the protrusion 20 bends into a V-shaped fashion at the maximum width portion 12. Such a protrusion 20 may enhance the rigidity of the groove bottom 8 so as to prevent deformation such that the groove walls 10 approach one another. This makes it possible to further improve the stone-biting.

Preferably, the protrusion 20 has a width W1 smaller than that of the maximum width portion 12 of the groove bottom 8 so as to have flexibility that can elastically deform easily to create sufficient resilience force to push the stone outwardly. When the width W1 of the protrusion 20 is excessively small, the rigidity of the protrusion 20 may be lowered. This may cause a chipping of the protrusion 20 or to generate less resilience to push the stone out of the groove. Preferably, the protrusion 20 has the width W1 in a range of not less than 20%, more preferably not less than 25%, but preferably not more than 40%, more preferably not more than 35% of the width Wa of the maximum width portion 12 of the groove bottom 8.

In order to further improve the effect described above, the protrusion 20 has a radial height H1, as shown in FIG. 4, in a range of not less than 5%, more preferably not less than 10%, but preferably not more than 25%, more preferably not more than 20% of the maximum depth D1 of the shoulder main groove 3. In the same point of view, the protrusion 20 has a circumferential length L1 in a range of from 20% to 40% of a circumferential pitch length P1 of the groove bottom 8, as shown in FIG. 2A.

In this embodiment, the protrusion 20 is not formed at the minimum width portion 13 of the groove bottom 8. This makes it possible to equalize the rigidity of the tread portion 2 around the shoulder main groove 3 in the circumferential direction of the tire, thereby further improving wear resistance of the tread portion 2.

As shown in FIG. 1, the shoulder main groove 3 preferably has the axial width Ws in a range of from 2% to 8% of the tread width TW in order to further improve the stone-biting resistance as well as the tread rigidity. Preferably, the shoulder main groove 3 has the maximum depth D1 of from 15 to 25 mm.

In this embodiment, the central main groove 4 extends in a zigzag manner in the circumferential direction of the tire. The central main groove 4 includes a groove bottom 4*a* having a constant width Wd in the circumferential direction of the tire. Furthermore, the groove bottom 4*a* and groove edges 4*b* of the central main groove 4 have the same zigzag amplitude. Preferably, the central main groove 4 has a width We in a range of from 2% to 8% of the tread width TW, and the maximum depth of from 15 to 25 mm, for example.

Second Embodiment

Figure 8:
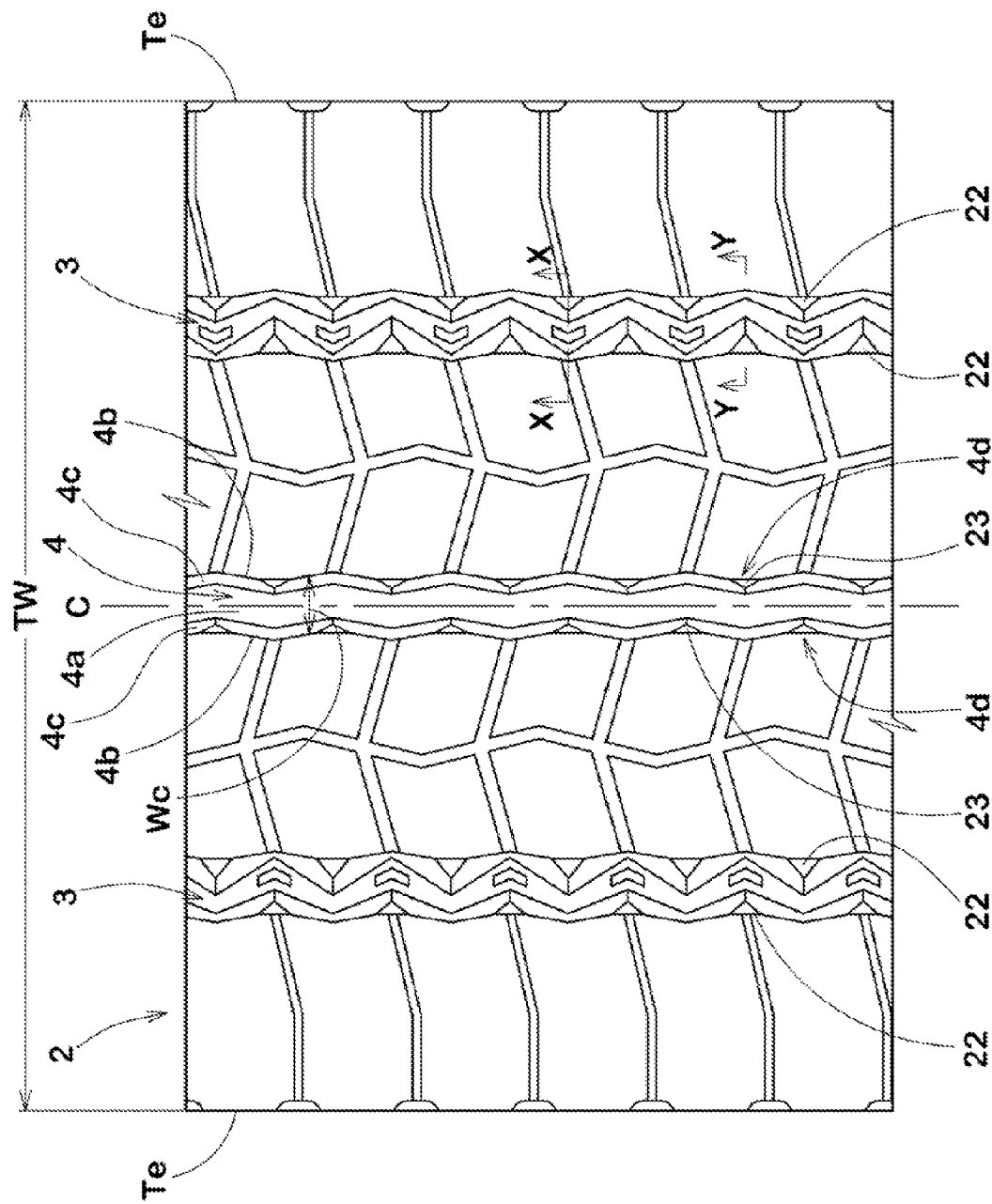
FIG. 8 is a development view of a tread portion of a pneumatic tire according to a second embodiment of the present invention.
Figure 9:
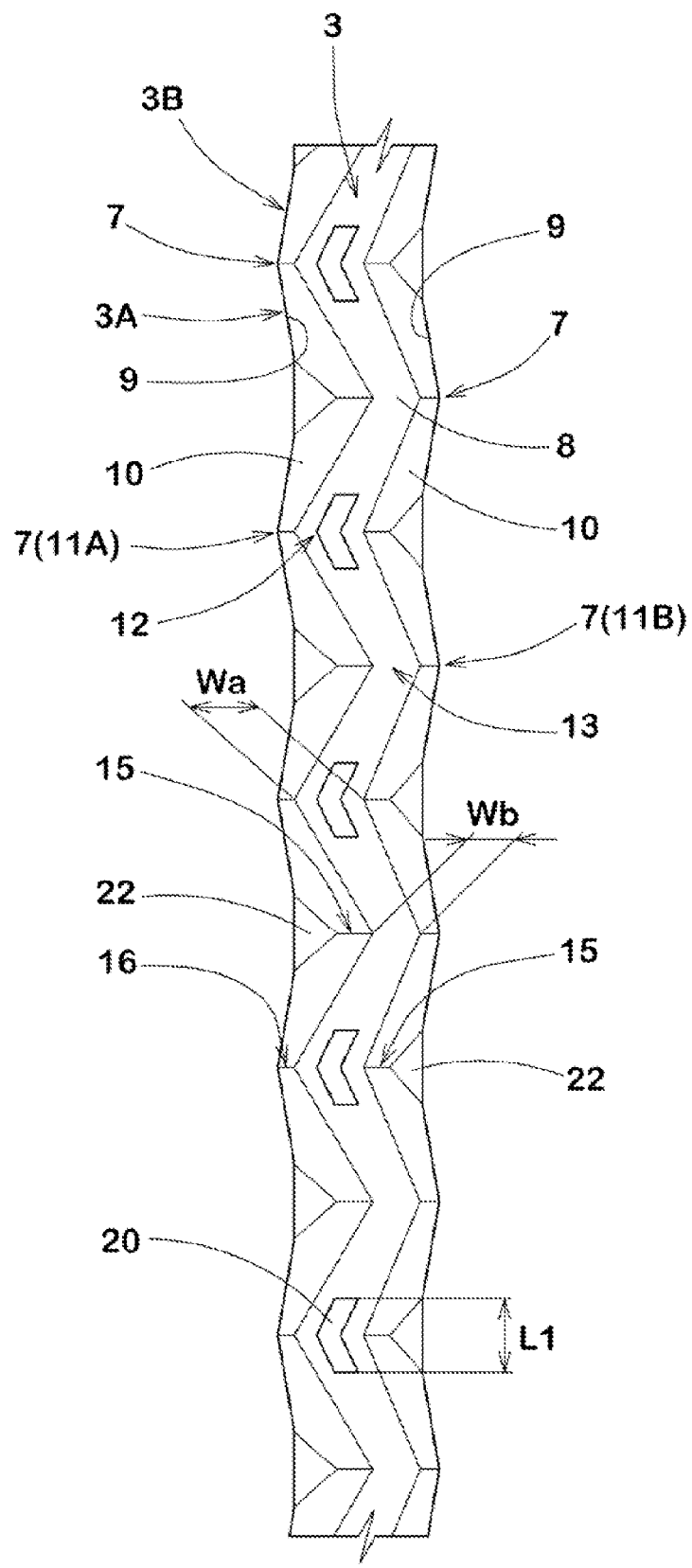
FIG. 9 is an enlarged view of the shoulder main groove illustrated in FIG. 8.

Next, the second embodiment of the present invention will be described below with reference to the accompanying drawings. FIG. 8 illustrates a development view of the tread portion 2 of the tire according to the second embodiment of the present invention. FIG. 9 illustrates an enlarged view of the right side shoulder main groove 3 of FIG. 8. As shown in FIGS. 8 and 9, the shoulder main groove 3 includes the pair of groove walls 10 each of which includes the external corner 15 and the internal corner 16 at the zigzag corners 7.

Generally, the external corner 15, particularly the radially outermost portion of the external corner 15 located near the ground contacting surface 2*a* of the tread portion 2 tends to be chipped during traveling due to its low rigidity. Such a chipping may cause uneven wear on the external corner 15. In the second embodiment of the present invention, a radially outward portion of the external corner 15 is provided with a chamfered portion 22 to prevent such uneven wear. The chamfered portion 22 may prevent a chipping of the external corner 15 at its radially outermost portion so that uneven wear is not caused. Furthermore, the chamfered portion 22 makes it possible to expand the groove width of the shoulder main groove 3 at the ground contacting surface of the tread portion 2, thereby releasing a stone trapped at the minimum width portion 13 or the maximum width portion 12 easily.

In order to further improve the effects described above, the chamfered portion 22 is preferably formed into a slanted triangle surface or plane that spreads among the ground contacting surface 2*a* of the tread portion 2 and a pair of two wall planes forming the external corner 15.

Figure 10:
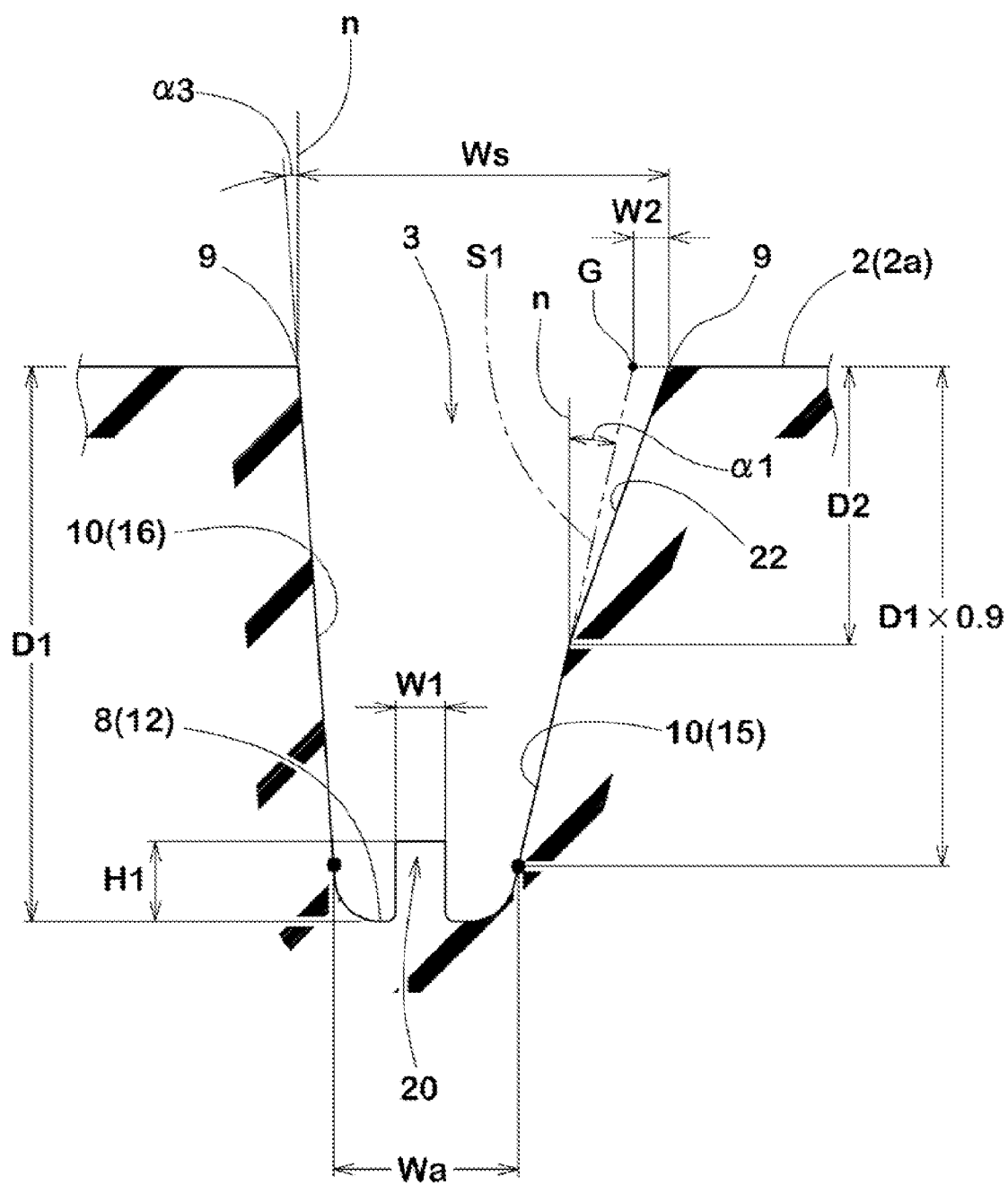
FIG. 10 is a cross-sectional view taken along the lines X-X of FIG. 8.
Figure 11:
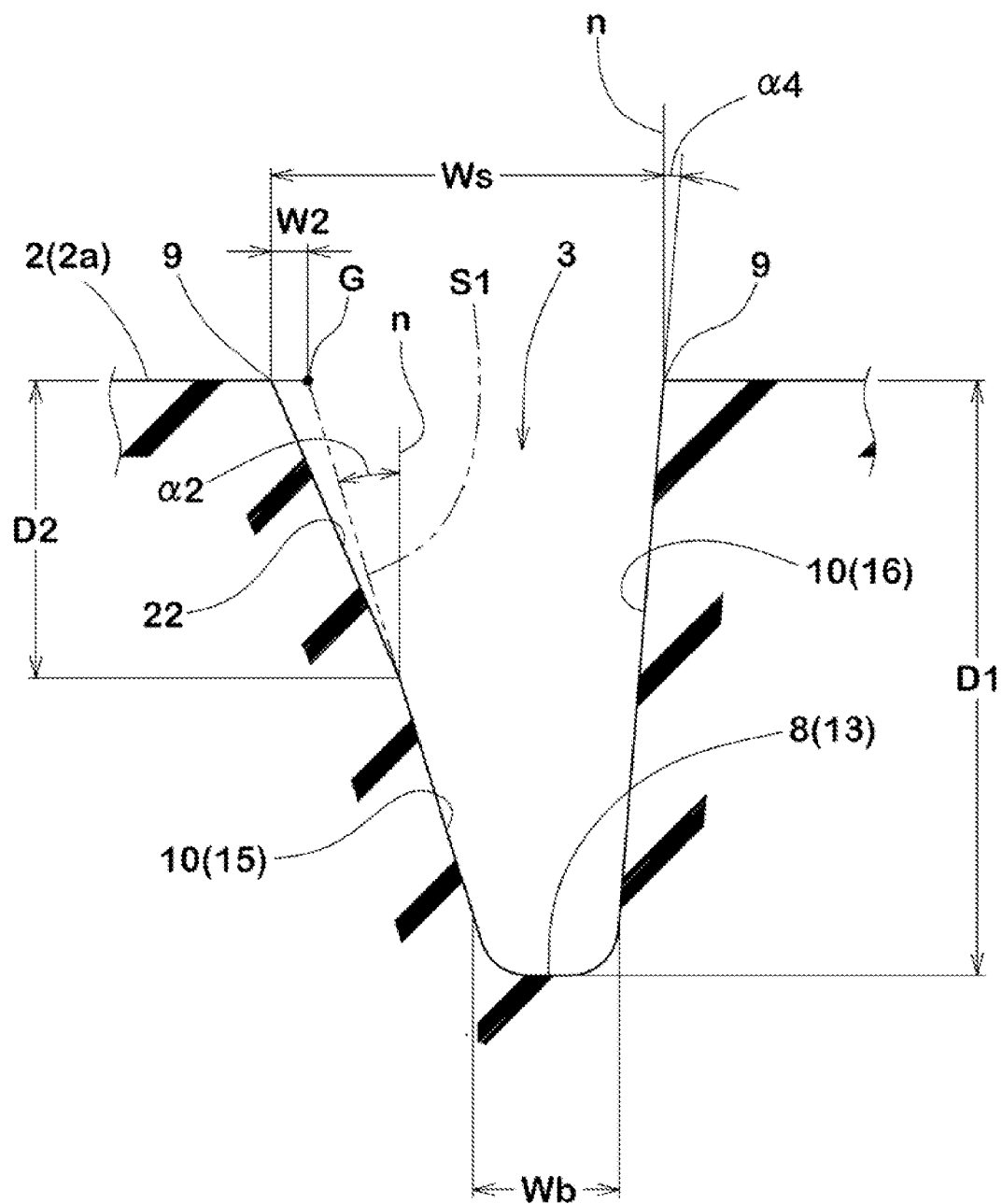
FIG. 11 is a cross-sectional view taken along the lines Y-Y of FIG. 8.
Figure 12:
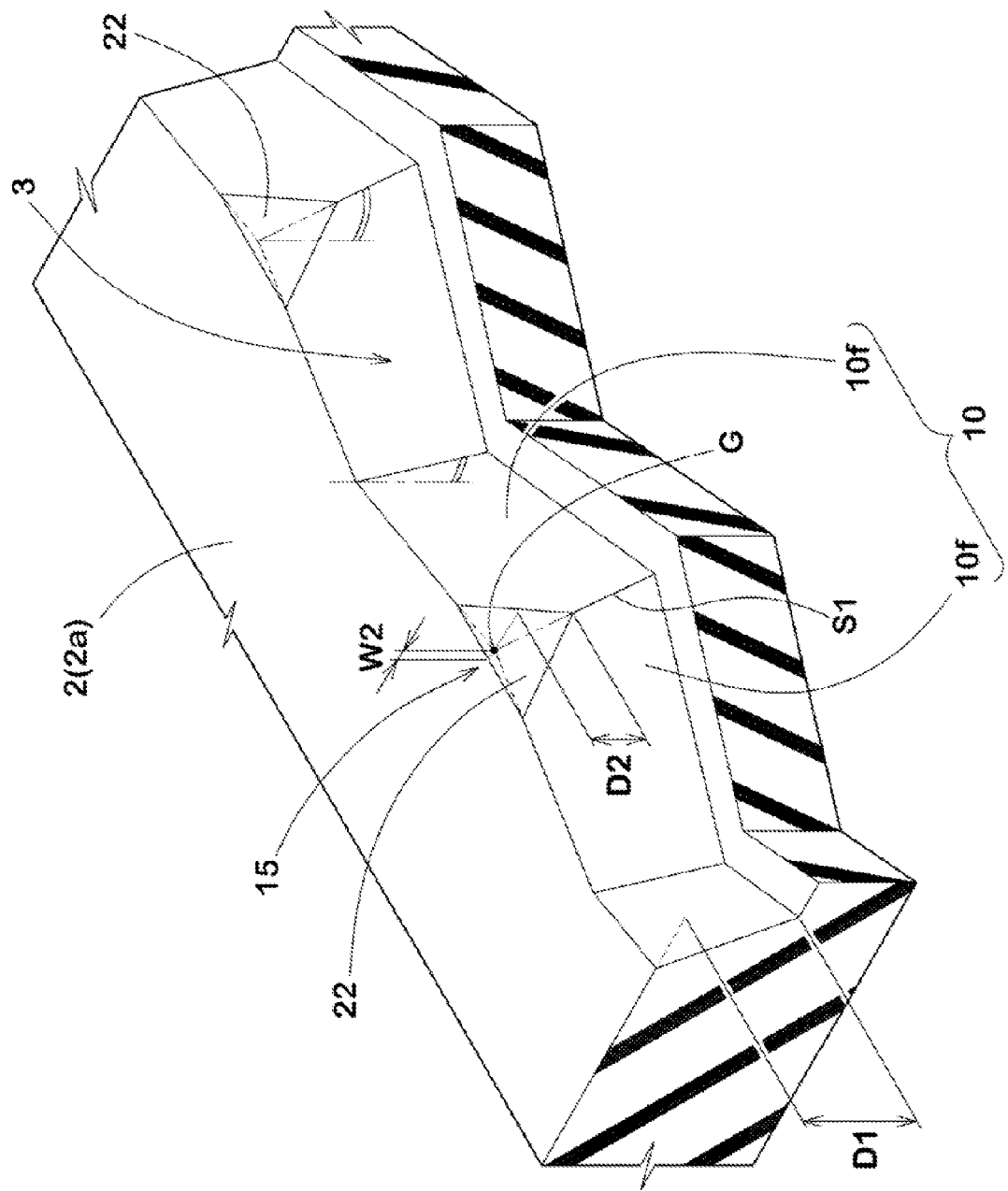
FIG. 12 is a partial perspective view of the shoulder main groove illustrated in FIG. 8.

FIG. 10 illustrates a cross-sectional view taken along the lines X-X of FIG. 8. FIG. 10 corresponds to a cross-sectional view of the shoulder main groove 3 at the maximum width portion 12. FIG. 11 illustrates a cross-sectional view taken along the lines Y-Y of FIG. 8. FIG. 11 corresponds to a cross-sectional view of the shoulder main groove 3 at the minimum width portion 13. FIG. 12 is a partial perspective view of the shoulder main groove 3 of FIG. 8. As shown in FIGS. 10 to 12, the chamfered portion 22 is preferably located at an axial distance W2 of from 0.5 to 3.0 mm from the imaginary point G where the ground contacting surface 2*a* of the tread portion 2 and a pair of two wall planes 10*f* forming the external corner 15 intersect imaginarily. Here, the reference sign "S1" denotes a ridge formed by two wall planes 10*f* forming the external corner 15. Such a specific structure of the chamfered portion 22 may further improve the above effects. In the same points of view, the chamfered portion 22 preferably has a radial length D2 in a range of from 25% to 60% of the maximum depth D1 of the shoulder main groove 3.

As shown in FIG. 8, the central main groove 4 includes the groove bottom 4*a*, the pair of groove walls 4*c*, and a pair of groove edges 4*b*. In this embodiment, the respective external corners 4*d* of the groove walls 4*c* of the central main groove 4 are provided with a chamfered portion 23 having the substantially same structure as the chamfered portion 22. Accordingly, the central main groove 4 may also prevent not only stone-biting but also uneven wear.

In this embodiment, the tread portion 2 is further provided with a plurality of narrow groove extending in a zigzag manner in the circumferential direction of the tire, foe example. Furthermore, the tread portion 2 is provided with a plurality of lateral grooves extending between the central main groove 4 and the shoulder main groove 3, or between the shoulder main groove 3 and the tread edge Te to improve traction and drainage performance of the tire.

While the particularly preferable embodiments of the pneumatic tire in accordance with the present invention have been described in detail, the present invention is not limited to the illustrated embodiments, but can be modified and carried out in various aspects.

First Example

Pneumatic tires having a size of 11R22.5 and a basic tread pattern shown in FIG. 1 were manufactured based on the specifications of Table 1 and tested. Major common specifications of tires and test procedures are as follows.
Specification:
Tread width TW: 218 mm
Shoulder and central main groove widths: 13.2 mm
Shoulder and central main groove depths: 21.6 mm As to the inclination angles α1 to α4 of the tires of Ref. 1 and Ref. 2 were measured at the same positions of the inclination angles α1 to α4 of tires of Examples.

Stone-Biting Resistance Test:

Each test tire was mounted on a 22.5×8.25 rim and inflated to an inner pressure of 830 kPa, and installed to all wheels of a 2-DD wheel type bus. Then a test driver drove the bus on a gravel road for 30,000 km. Then the number of stones trapped in the shoulder main grooves of the rear wheels was counted. The results are shown in Table 1 using an index based on Ex. 1 being 100. The larger the value, the higher the performance is.

Uneven Wear Resistance Test:

After the stone-biting test, the uneven wear state of the front wheels such as step down wear, river wear, rail wear and the like were checked through the naked eyes of the test driver. The results are shown in Table 1 using a score from 1 to 5 based on the most excellent tire being 5. The larger the value, the higher the performance is.

The test result are shown in Table 1. From the test results, it was confirmed that the example tires had excellent stone-biting resistance and uneven wear resistance as compared with the reference tires. Furthermore, another test was conducted using tires having a different tire size, wherein the same test results were confirmed.

TABLE 1

Figure 6:
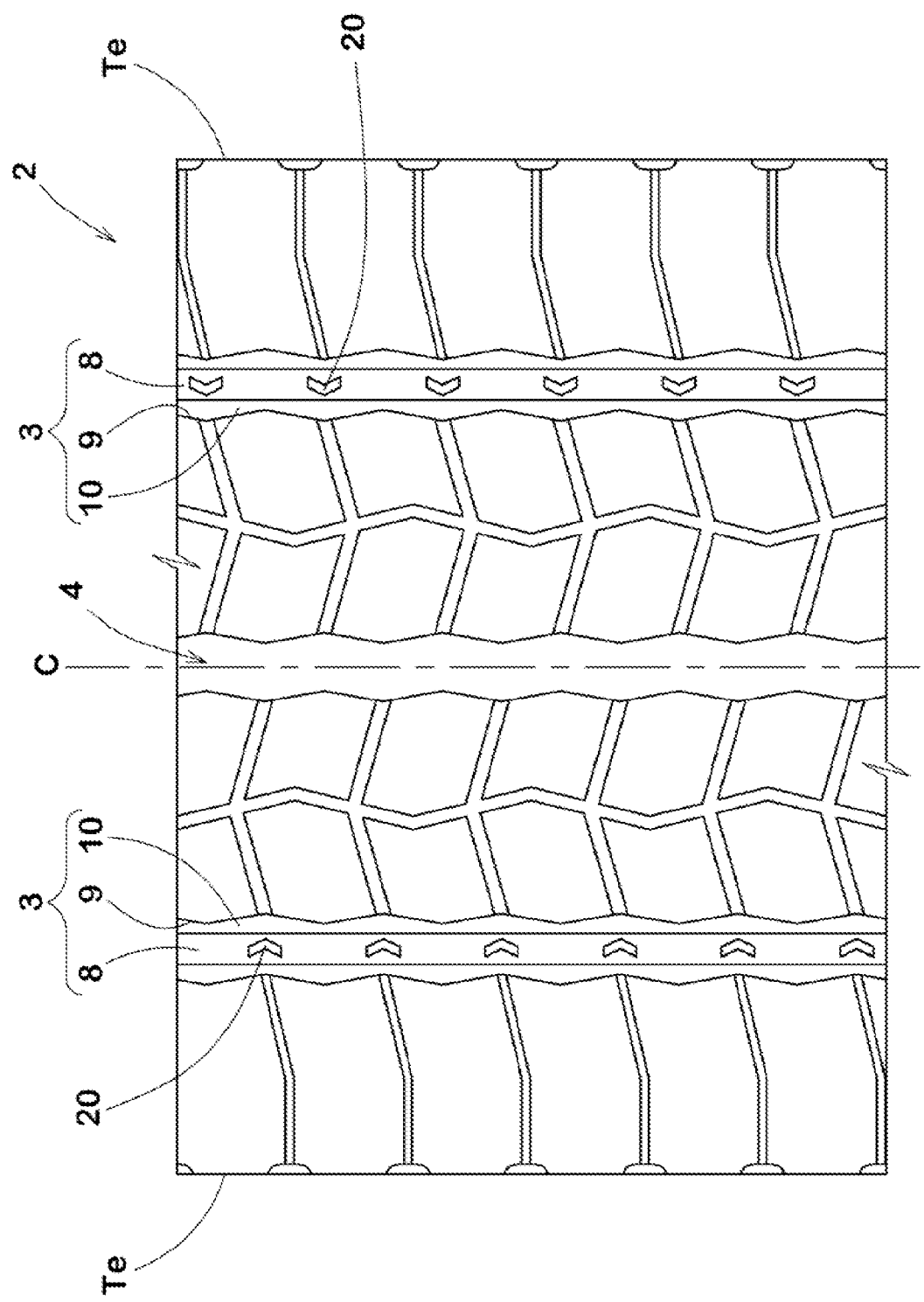
FIG. 6 is a development view of a tread portion of a reference pneumatic tire.
Figure 7:
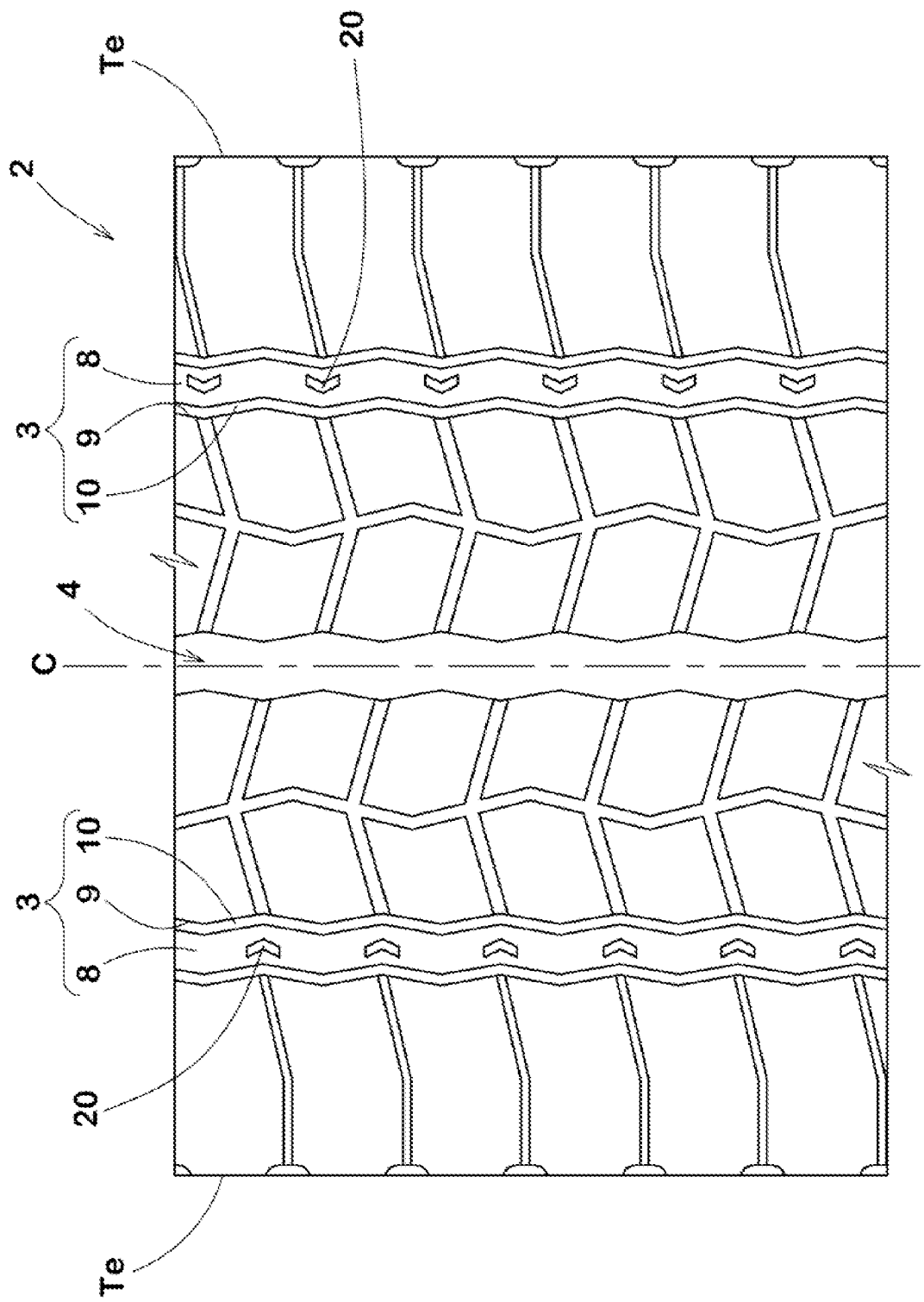
FIG. 7 is a development view of a tread portion of another reference pneumatic tire.

|  | Ref. 1 | Ref. 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| Tread pattern | FIG. 6 | FIG. 7 | FIG. 1 | FIG. 1 | FIG. 1 | FIG. 1 | FIG. 1 | FIG. 1 | FIG. 1 | FIG. 1 |
| Amplitude ratio V2/V1 (%) | 100 | 100 | 35 | 15 | 20 | 50 | 60 | 35 | 35 | 35 |
| Inclination angle α1 of external corner at maximum width portion (deg.) | 6.0 | 8.0 | 13.5 | 13.5 | 13.5 | 13.5 | 13.5 | 5.0 | 8.0 | 20.0 |
| Inclination angle α2 of external corner at minimum width portion (deg.) | 6.0 | 8.0 | 17.0 | 17.0 | 17.0 | 17.0 | 17.0 | 17.0 | 17.0 | 17.0 |
| Inclination angle α3 of internal corner at maximum width portion (deg.) | 12.0 | 8.0 | 4.0 | 4.0 | 4.0 | 4.0 | 4.0 | 4.0 | 4.0 | 4.0 |
| Inclination angle α4 of internal corner at minimum width portion (deg.) | 12.0 | 8.0 | 5.5 | 5.5 | 5.5 | 5.5 | 5.5 | 5.5 | 5.5 | 5.5 |
| Protrusion height ratio H1/D1 (%) | 14 | 14 | 14 | 14 | 14 | 14 | 14 | 14 | 14 | 14 |
| Protrusion width ratio W1/Wa (%) | 40 | 40 | 31 | 31 | 31 | 31 | 31 | 31 | 31 | 31 |
| Stone-biting resistance [Index] | 85 | 80 | 100 | 95 | 95 | 95 | 90 | 100 | 100 | 95 |
| Uneven wear resistance [Score] | 3 | 4 | 5 | 4 | 5 | 5 | 5 | 4 | 5 | 5 |
|  | Ex. 9 | Ex. 10 | Ex. 11 | Ex. 12 | Ex. 13 | Ex. 14 | Ex. 15 | Ex. 16 | Ex. 17 | Ex. 18 |
| Tread pattern | FIG. 1 | FIG. 1 | FIG. 1 | FIG. 1 | FIG. 1 | FIG. 1 | FIG. 1 | FIG. 1 | FIG. 1 | FIG. 1 |
| Amplitude ratio V2/V1 (%) | 35 | 35 | 35 | 35 | 35 | 35 | 35 | 35 | 35 | 35 |
| Inclination angle α1 of external corner at maximum width portion (deg.) | 22.0 | 13.5 | 13.5 | 13.5 | 13.5 | 13.5 | 13.5 | 13.5 | 13.5 | 13.5 |
| Inclination angle α2 of external corner at minimum width portion (deg.) | 17.0 | 13.0 | 14.0 | 22.0 | 23.0 | 17.0 | 17.0 | 17.0 | 17.0 | 17.0 |
| Inclination angle α3 of internal corner at maximum width portion (deg.) | 4.0 | 4.0 | 4.0 | 4.0 | 4.0 | 1.0 | 2.0 | 7.0 | 10.0 | 4.0 |
| Inclination angle α4 of internal corner at minimum width portion (deg.) | 5.5 | 5.5 | 5.5 | 5.5 | 5.5 | 5.5 | 5.5 | 5.5 | 5.5 | 1.0 |
| Protrusion height ratio H1/D1 (%) | 14 | 14 | 14 | 14 | 14 | 14 | 14 | 14 | 14 | 14 |
| Protrusion width ratio W1/Wa (%) | 31 | 31 | 31 | 31 | 31 | 31 | 31 | 31 | 31 | 31 |
| Stone-biting resistance [Index] | 90 | 90 | 95 | 100 | 100 | 100 | 100 | 95 | 90 | 90 |
| Uneven wear resistance [Score] | 5 | 5 | 5 | 5 | 4 | 4 | 5 | 5 | 5 | 5 |
|  | Ex. 19 | Ex. 20 | Ex. 21 | Ex. 21 | Ex. 22 | Ex. 23 | Ex. 24 | Ex. 25 | Ex. 26 | Ex. 27 | Ex. 28 |
| Tread pattern | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Amplitude ratio V2/V1 (%) | 35 | 35 | 35 | 35 | 35 | 35 | 35 | 35 | 35 | 35 | 35 |
| Inclination angle α1 of external corner at maximum width portion (deg.) | 13.5 | 13.5 | 13.5 | 13.5 | 13.5 | 13.5 | 13.5 | 13.5 | 13.5 | 13.5 | 13.5 |
| Inclination angle α2 of external corner at minimum width portion (deg.) | 17.0 | 17.0 | 17.0 | 13.0 | 14.0 | 22.0 | 23.0 | 17.0 | 17.0 | 17.0 | 17.0 |
| Inclination angle α3 of internal corner at maximum width portion (deg.) | 4.0 | 4.0 | 4.0 | 4.0 | 4.0 | 4.0 | 4.0 | 1.0 | 2.0 | 7.0 | 10.0 |
| Inclination angle α4 of internal corner at minimum width portion (deg.) | 2.5 | 10.0 | 11.0 | 5.5 | 5.5 | 5.5 | 5.5 | 5.5 | 5.5 | 5.5 | 5.5 |
| Protrusion height ratio H1/D1 (%) | 14 | 14 | 14 | 3 | 5 | 25 | 30 | 14 | 14 | 14 | 14 |
| Protrusion width ratio W1/Wa (%) | 31 | 31 | 31 | 31 | 31 | 31 | 31 | 15 | 20 | 40 | 45 |
| Stone-biting resistance [Index] | 95 | 100 | 100 | 90 | 95 | 95 | 90 | 90 | 95 | 95 | 90 |
| Uneven wear resistance [Score] | 5 | 5 | 4 | 5 | 5 | 5 | 5 | 5 | 5 | 5 | 5 |

Second Example

Pneumatic tires having a size of 11R22.5 and a basic tread pattern shown in FIG. 8 were manufactured based on the specifications of Table 2 and tested in accordance with the same manner as described above. The tire of Ref. 3 was not provided with the chamfered portion.

The test result are shown in Table 2. From the test results, it was confirmed that the example tires had excellent stone-biting resistance and uneven wear resistance as compared with the reference tire.

TABLE 2

|  | Ref. 3 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Axial distance W2 of chamfered portion from imaginary point (mm) | — | 1.6 | 0.4 | 0.5 | 3.0 | 3.5 | 1.6 | 1.6 | 1.6 | 1.6 |
| Chamfered portion height ratio D2/D1 (%) | — | 50 | 50 | 50 | 50 | 50 | 20 | 25 | 60 | 65 |
| Inclination angle $\alpha 1$ of external corner at maximum width portion (deg.) | 13.5 | 13.5 | 13.5 | 13.5 | 13.5 | 13.5 | 13.5 | 13.5 | 13.5 | 13.5 |
| Inclination angle $\alpha 3$ of internal corner at maximum width portion (deg.) | 4.0 | 4.0 | 4.0 | 4.0 | 4.0 | 4.0 | 4.0 | 4.0 | 4.0 | 4.0 |
| Inclination angle $\alpha 2$ of external corner at minimum width portion (deg.) | 17.0 | 17.0 | 17.0 | 17.0 | 17.0 | 17.0 | 17.0 | 17.0 | 17.0 | 17.0 |
| Inclination angle $\alpha 4$ of internal corner at minimum width portion (deg.) | 5.5 | 5.5 | 5.5 | 5.5 | 5.5 | 5.5 | 5.5 | 5.5 | 5.5 | 5.5 |
| Protrusion width ratio W1/Wa (%) | 31 | 31 | 31 | 31 | 31 | 31 | 31 | 31 | 31 | 31 |
| Protrusion height ratio H1/D1 (%) | 14 | 14 | 14 | 14 | 14 | 14 | 14 | 14 | 14 | 14 |
| Stone-biting resistance [Index] | 50 | 100 | 70 | 80 | 100 | 100 | 70 | 80 | 90 | 80 |
| Uneven wear resistance [Score] | 2 | 5 | 3 | 4 | 3 | 2 | 4 | 4 | 3 | 2 |

|  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| Axial distance W2 of chamfered portion from imaginary point (mm) | 1.6 | 1.6 | 1.6 | 1.6 | 1.6 | 1.6 | 1.6 | 1.6 | 1.6 | 1.6 |
| Chamfered portion height ratio D2/D1 (%) | 50 | 50 | 50 | 50 | 50 | 50 | 50 | 50 | 50 | 50 |
| Inclination angle $\alpha 1$ of external corner at maximum width portion (deg.) | 5.0 | 8.0 | 20.0 | 22.0 | 13.5 | 13.5 | 13.5 | 13.5 | 13.5 | 13.5 |
| Inclination angle $\alpha 3$ of internal corner at maximum width portion (deg.) | 4.0 | 4.0 | 4.0 | 4.0 | 1.0 | 2.0 | 7.0 | 10.0 | 4.0 | 4.0 |
| Inclination angle $\alpha 2$ of external corner at minimum width portion (deg.) | 17.0 | 17.0 | 17.0 | 17.0 | 17.0 | 17.0 | 17.0 | 17.0 | 13.0 | 14.0 |
| Inclination angle $\alpha 4$ of internal corner at minimum width portion (deg.) | 5.5 | 5.5 | 5.5 | 5.5 | 5.5 | 5.5 | 5.5 | 5.5 | 5.5 | 5.5 |
| Protrusion width ratio W1/Wa (%) | 31 | 31 | 31 | 31 | 31 | 31 | 31 | 31 | 31 | 31 |
| Protrusion height ratio H1/D1 (%) | 14 | 14 | 14 | 14 | 14 | 14 | 14 | 14 | 14 | 14 |
| Stone-biting resistance [Index] | 70 | 80 | 90 | 80 | 100 | 100 | 80 | 70 | 70 | 80 |
| Uneven wear resistance [Score] | 5 | 5 | 4 | 3 | 2 | 3 | 5 | 5 | 5 | 5 |

|  | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|
| Axial distance W2 of chamfered portion from imaginary point (mm) | 1.6 | 1.6 | 1.6 | 1.6 | 1.6 | 1.6 | 1.6 | 1.6 | 1.6 | 1.6 |
| Chamfered portion height ratio D2/D1 (%) | 50 | 50 | 50 | 50 | 50 | 50 | 50 | 50 | 50 | 50 |
| Inclination angle $\alpha 1$ of external corner at maximum width portion (deg.) | 13.5 | 13.5 | 13.5 | 13.5 | 13.5 | 13.5 | 13.5 | 13.5 | 13.5 | 13.5 |
| Inclination angle $\alpha 3$ of internal corner at maximum width portion (deg.) | 4.0 | 4.0 | 4.0 | 4.0 | 4.0 | 4.0 | 4.0 | 4.0 | 4.0 | 4.0 |
| Inclination angle $\alpha 2$ of external corner at minimum width portion (deg.) | 22.0 | 23.0 | 17.0 | 17.0 | 17.0 | 17.0 | 17.0 | 17.0 | 17.0 | 17.0 |
| Inclination angle $\alpha 4$ of internal corner at minimum width portion (deg.) | 5.5 | 5.5 | 1.0 | 2.5 | 10.0 | 11.0 | 5.5 | 5.5 | 5.5 | 5.5 |
| Protrusion width ratio W1/Wa (%) | 31 | 31 | 31 | 31 | 31 | 31 | 15 | 20 | 40 | 45 |
| Protrusion height ratio H1/D1 (%) | 14 | 14 | 14 | 14 | 14 | 14 | 14 | 14 | 14 | 14 |
| Stone-biting resistance [Index] | 100 | 100 | 70 | 80 | 80 | 70 | 70 | 80 | 80 | 70 |
| Uneven wear resistance [Score] | 3 | 2 | 2 | 2 | 3 | 2 | 5 | 5 | 5 | 5 |

|  | Ex. 31 | Ex. 32 | Ex. 33 | Ex. 34 |
|---|---|---|---|---|
| Axial distance W2 of chamfered portion from imaginary point (mm) | 1.6 | 1.6 | 1.6 | 1.6 |
| Chamfered portion height ratio D2/D1 (%) | 50 | 50 | 50 | 50 |
| Inclination angle $\alpha 1$ of external corner at maximum width portion (deg.) | 13.5 | 13.5 | 13.5 | 13.5 |
| Inclination angle $\alpha 3$ of internal corner at maximum width portion (deg.) | 4.0 | 4.0 | 4.0 | 4.0 |
| Inclination angle $\alpha 2$ of external corner at minimum width portion (deg.) | 17.0 | 17.0 | 17.0 | 17.0 |
| Inclination angle $\alpha 4$ of internal corner at minimum width portion (deg.) | 5.5 | 5.5 | 5.5 | 5.5 |

TABLE 2-continued

| | | | | |
|---|---|---|---|---|
| Protrusion width ratio W1/Wa (%) | 31 | 31 | 31 | 31 |
| Protrusion height ratio H1/D1 (%) | 3 | 5 | 25 | 30 |
| Stone-biting resistance [Index] | 70 | 80 | 90 | 70 |
| Uneven wear resistance [Score] | 5 | 5 | 5 | 5 |

What is claimed is:

1. A pneumatic tire comprising:

a tread portion provided with at least one zigzag main groove extending continuously in a circumferential direction of the tire with a plurality of zigzag corners;

the main groove comprising a groove bottom and a pair of groove edges, the main groove arranged between a tread edge and a tire equator;

the groove bottom extending in a zigzag manner in the circumferential direction of the tire with a first amplitude, the groove bottom having a width varying periodically so that a maximum width portion and a minimum width portion appear in turn at the zigzag corners;

the zigzag corners comprising an axially inner protruding corner that protrudes toward the tire equator and an axially outer protruding corner that protrudes toward the tread edge, wherein the maximum width portion of the groove bottom is located at the axially inner protruding corner; and each of the groove edges extending in a zigzag manner in the circumferential direction of the tire with a second amplitude, wherein the first amplitude is greater than the second amplitude.

2. The pneumatic tire according to claim 1, wherein the main groove comprises a pair of groove walls each of which extends from the groove bottom to one of the groove edges, each of the groove walls comprises an external corner that protrudes outwardly and an internal corner that is dented inwardly, and an inclination angle $\alpha 2$ of the external corner with respect to a tread normal line at the minimum width portion of the groove bottom is greater than an inclination angle $\alpha 1$ of the external corner with respect to the tread normal line at the maximum width portion of the groove bottom.

3. The pneumatic tire according to claim 1, wherein the main groove comprises a pair of groove walls each of which extends from the groove bottom to one of the groove edges, each of the groove walls comprises an external corner that protrudes outwardly and an internal corner that is dented inwardly, and an inclination angle $\alpha 3$ of the internal corner with respect to a tread normal line at the maximum width portion of the groove bottom is equal to or less than an inclination angle $\alpha 4$ of the internal corner with respect to the tread normal line at the minimum width portion of the groove bottom.

4. The pneumatic tire according to claim 1, wherein the main groove is provided with a protrusion on the groove bottom, the protrusion is formed at the maximum width portion of the groove bottom, and the protrusion is not formed at the minimum width portion of the groove bottom.

5. The pneumatic tire according to claim 4, wherein the protrusion has a width smaller than that of the maximum width portion of the groove bottom.

6. The pneumatic tire according to claim 4, wherein the protrusion has a width in a range of from 20% to 40% of a width of the maximum width portion of the groove bottom.

7. The pneumatic tire according to claim 4, wherein the protrusion has a radial height in a range of from 5% to 25% of a maximum depth of the main groove.

8. The pneumatic tire according to claim 4, wherein the protrusion bends into a V-shaped fashion so as to extend along the centerline of the groove bottom.

9. The pneumatic tire according to claim 1, wherein the main groove comprises a pair of groove walls each of which extends from the groove bottom to one of the groove edges, each of the groove walls comprises an external corner that protrudes outwardly, and a radially outward portion of the external corner is provided with a chamfered portion.

10. The pneumatic tire according to claim 9, wherein the chamfered portion has a slanted surface that spreads among a ground contacting surface of the tread portion and a pair of two wall planes forming the external corner.

11. The pneumatic tire according to claim 9, wherein the chamfered portion is located in an axial distance of from 0.5 to 3.0 mm from an imaginary point where a ground contacting surface of the tread portion and a pair of two wall planes forming the external corner intersect imaginarily.

12. The pneumatic tire according to claim 9, wherein the chamfered portion has a radial length in a range of from 25% to 60% of a maximum depth of the main groove.

13. The pneumatic tire according to claim 9, wherein each of the groove walls comprises an internal corner that is dented inwardly, and an inclination angle of the external corner with respect to a tread normal line is greater than an inclination angle of the internal corner with respect to the tread normal line in the respective zigzag corners.

* * * * *